United States Patent Office 2,952,572
Patented Sept. 13, 1960

2,952,572

PRIMARY CELL ELECTROLYTE

Theodore B. Johnson, Stratford, Conn., assignor to Remington Arms Company, Inc., Bridgeport, Conn., a corporation of Delaware No Drawing. Filed July 9, 1958, Ser. No. 747,332

8 Claims. (Cl. 136—154)

This invention relates to electrolytes for primary or current generating cells, particularly to electrolytes that make practical the use of lead dioxide as a cathode material, and provide improved characteristics with many cathode and anode materials known in the battery art.

Lead dioxide, also known as lead peroxide, has long been considered as a potentially valuable cathode or "depolarizing" material for primary cells. Although practically insoluble in water, lead dioxide has sufficient solubility in many of the electrolytes used in, or proposed for, primary cells that it has been dismissed as impractical. It has been used in certain high drain, reserve type cells in which the effects of solubility have been minimized by adding the electrolyte just before discharge, and in storage batteries in which long stands in contact with the electrolyte, without charge or discharge, are not usual. Prolonged contact of lead dioxide with these electrolytes results in soluble radicals or molecules containing tetravalent lead. These radicals eventually migrate to or are attracted to the anode or an electronically conductive part of the battery attached to the anode. There they are reduced to a lower valence level without the production of useful electrical energy, with an equivalent loss in battery capacity. If the anode is a metal more active than lead, lead "treeing" may occur; that is, the tetravalent lead may be reduced to crystalline metallic lead. If the lead "trees" span the gap between anode and cathode, they form internal short circuits resulting in complete failure of the cell. The cell discharge products of lead dioxide may be divalent lead compounds, many of which are more soluble than the lead dioxide with the same disastrous consequences to cell performance.

Although the solubility of many lead compounds is most pronounced in strongly acid or strongly alkaline solutions, many mildly alkaline or acid, or even neutral, electrolytes may dissolve enough divalent or tetravalent lead to prevent the use of lead dioxide as a cathode material. Is has been found as a part of this invention, however, that electrolyte solutions of the more soluble phosphate salts, i.e., ammonium, potassium and sodium phosphates, in the range of about pH 4 to pH 12.5, repress solubility sufficiently to make practical the use of lead dioxide. The potentials of cells containing phosphate electrolytes are shown in Table I, below, Examples 1–17, 20–23, 26, 27, 29–31, 33–36. Several distinct advantages are obtained:

a. Lead dioxide is relatively inexpensive, being considerably cheaper than compounds of mercury and silver.

*Table I*

| Example Number | Electrolyte | Ratio of Metal Plus Ammonium to Phosphate | Approx. pH | Cathode | Anode | Open Circuit Voltage |
|---|---|---|---|---|---|---|
| 1 | Potassium phosphate | 1:1 | 5.0 | Lead dioxide+15% graphite | Amalgamated zinc | 1.98 |
| 2 | do | 3:2 | 7.1 | do | do | 1.97 |
| 3 | do | 2:1 | 10.0 | do | do | 1.69 |
| 4 | do | 3:1 | 12.6 | do | do | 1.62 |
| 5 | Sodium phosphate | 1:1 | 4.5 | do | do | 2.09 |
| 6 | do | 3:2 | 6.4 | do | do | 1.98 |
| 7 | do | 2:1 | 8.8 | do | do | 1.65 |
| 8 | do | 3:1 | 12.0 | do | do | 1.60 |
| 9 | Ammonium phosphate | 1:1 | 5.0 | do | do | 2.00 |
| 10 | do | 3:2 | 7.0 | do | do | 1.96 |
| 11 | do | 2:1 | 8.6 | do | do | 1.83 |
| 12 | do | 3:1 | 9.8 | do | do | 1.79 |
| 13 | Sod. Ammonium phosphate | 2:1 | 9.1 | do | do | 1.75 |
| 14 | Potassium phosphate | 1:1 | 5.0 | Lead dioxide | do | 2.00 |
| 15 | do | 2:1 | 10.0 | do | do | 1.70 |
| 16 | do | 1:1 | 5.0 | Lead dioxide+15% graphite | Zinc | 1.78 |
| 17 | do | 2:1 | 10.0 | do | do | 1.68 |
| 18 | Ammonium chloride+zinc chloride | | 5.4 | Manganese dioxide +15% graphite | Amalgamated zinc | 1.68 |
| 19 | do | | 5.4 | do | Zinc | 1.60 |
| 20 | Potassium phosphate+zinc oxide | ¹1:1 | 4.7 | do | Amalgamated zinc | 1.75 |
| 21 | do | ¹1:1 | 4.7 | do | Zinc | 1.73 |
| 22 | Ammonium phosphate | 1:1 | 5.0 | Manganese dioxide +15% graphite | Amalgamated zinc | 1.83 |
| 23 | do | 2:1 | 8.6 | do | do | 1.81 |
| 24 | Ammonium chloride+zinc chloride | | 5.4 | Lead dioxide+15% graphite | do | 1.75 |
| 25 | do | | 5.4 | do | Zinc | 1.75 |
| 26 | Potassium phosphate+zinc oxide | ¹1:1 | 4.7 | do | Amalgamated zinc | 1.87 |
| 27 | do | ¹1:1 | 4.7 | do | Zinc | 1.82 |
| 28 | Potassium hydroxide+zinc oxide | | >13.6 | Mercuric oxide+8% graphite | Amalgamated zinc | 1.37 |
| 29 | Potassium phosphate | 1:1 | 5.0 | do | do | 1.42 |
| 30 | do | 2:1 | 10.0 | do | do | 1.53 |
| 31 | Potassium phosphate+zinc oxide | ¹2:1 | 11.5 | do | do | 1.43 |
| 32 | Potassium hydroxide+zinc oxide | | >13.6 | Lead dioxide+15% graphite | do | 1.53 |
| 33 | Potassium phosphate+zinc oxide | ¹2:1 | 11.5 | do | do | 1.60 |
| 34 | Potassium phosphate | 1:1 | 5.0 | do | Iron | 1.35 |
| 35 | do | | 5.0 | do | Tin | 1.30 |
| 36 | do | | 5.0 | do | Lead | 1.30 |

¹ Excluding zinc.

b. Lead dioxide has a high oxidizing potential and with phosphate electrolytes, this potential may be even higher than with electrolytes, in the same pH range, in which lead dioxide and its drainage products are relatively soluble. See Examples 24–27, 32, 33, Table I.

c. Lead dioxide is electronically conductive and hence can be used undiluted, that is without the admixture of inert conductive material. See Examples 14 and 15, Table I; Examples 1 and 2, Table II.

d. The phosphate electrolytes are readily available and inexpensive; they are less harmful to the person and generally less corrosive than most of the well known battery electrolytes.

These phosphate electrolytes can also be used with many of the anode-cathode combinations well known in the battery industry, with resulting increases in potential over those obtained with the electrolytes with which they are usually associated. Examples 18–23, 28–36, Table I, illustrate this for zinc, iron, tin, lead anodes with mercuric oxide and manganese dioxide cathodes. Despite the high potentials obtained, anode and cathode stabilities are good, as is evidenced by low gassing or self-discharge rates.

Best results have been obtained with solutions of salts in which the ratio of metal or ammonium to phosphate ranges from about 1 to 1 to about 3 to 1; a formula of $MH_2PO_4$ to $M_3PO_4$ where M is potassium, sodium or ammonium. This covers a range of approximately pH 4.0 to approximately pH 12.5. Mixtures of the above phosphates may be used as long as the total metal plus ammonium to phosphate ratio is maintained.

Generally, good results are obtained with the more concentrated solutions, that is, approaching saturation at room temperature. However, useful cells have been made with electrolytes in which the phosphate salt content has varied from about 20% of saturation to at least 100% of solid material in excess of the saturation amount. Some or all of the excess solid electrolyte may be combined with the cathode material.

The potassium and ammonium phosphates perform better than the sodium phosphates. The latter, although having some utility at low currents, are not as satisfactory with respect to current drain and polarization. The ammonium phosphates with zinc anodes generally provide higher voltages than do the equivalent potassium phosphates, particularly at the higher metal to phosphate ratios. However, the potassium phosphates provide better stability with zinc anodes, and thus may be preferable for some uses.

Cells containing potassium or ammonium phosphate electrolytes have been made in a wide range of sizes and in several designs. "C" and "D" size cells (approximately 1.25 and 2.75 cubic inches, respectively), constructed mechanically in accordance with the well-known Leclanché design, have been made for the operation of "book" size 12 v. transistor radios. Six cells in series (eight of the usual flashlight type cells are required) gave satisfactory operation at the required drainages of 15 to 50 milliwatts per cell. Three "AA" size cells (approximately 0.42 cubic inch) operated a "pocket" size 6 v. transistor radio at about 8 to 20 milliwatts per cell. Miniature "button" or hearing aid type cells (approximately 0.06 cubic inch), operating at 1 to 3 mw., also have been made. Properties of some of these cells are listed in Table II, below.

The methods of preparation of the electrolytes may be any of several well known to any chemist. For example, a potassium phosphate electrolyte containing potassium and phosphate in the ratio 3 to 2 may be prepared by any of the following methods, all of which result in the same final product.

a. Combine two gram molecular weights of monopotassium dihydrogen orthophosphate with one gram molecular weight of potassium hydroxide and sufficient water to dissolve.

b. Combine one gram molecular weight of monopotassium dihydrogen orthophosphate with 1 gram molecular weight of dipotassium monohydrogen orthophosphate and sufficient water to dissolve.

c. Combine one gram molecular weight of tripotassium orthophosphate with one gram molecular weight of orthophosphoric acid and sufficient water to dissolve.

d. Combine 3 gram molecular weights of potassium hydroxide with 2 gram molecular weights of orthophosphoric acid and sufficient water to dissolve.

e. Combine 1½ gram molecular weights of dipotassium monohydrogen orthophosphate with ½ gram molecular weight of orthophosphoric acid and sufficient water to dissolve.

*Table II*

| | Mechanical Construction | Size | Electrolyte and Immobilizer | Cathode | Anode | Initial Open Circuit Voltage | Power, in Milliwatts, Drawn Above 1.4 Volts Cutoff |
|---|---|---|---|---|---|---|---|
| 1 | Leclanché | "D" | Monopotassium phosphate-starch. | Lead dioxide. | Amalgamated zinc. | 2.00 | 50 |
| 2 | do | "C" | do | do | do | 2.00 | 50 |
| 3 | do | "C" | do | Lead dioxide + 15% graphite. | do | 1.98 | 50 |
| 4 | do | "C" | Monopotassium phosphate-sodium alginate. | do | do | 1.98 | 50 |
| 5 | do | "C" | Dipotassium phosphate-sodium alginate. | do | do | 1.69 | 50 |
| 6 | do | "C" | Monoammonium phosphate-starch. | do | do | 2.00 | 50 |
| 7 | do | "AA" | do | do | do | 2.00 | 20 |
| 8 | do | "AA" | Diammonium phosphate-starch. | do | do | 1.83 | 20 |
| 9 | Hearing aid | "Button." | Monopotassium phosphate-Webril paper. | do | do | 1.98 | 3 |

In battery manufacture these electrolytes may be incorporated in the cells as the free liquid or absorbed in any of various bibulous materials as commonly practiced. They also may be immobilized by gelatinization with starch, salts of carboxy-methyl cellulose and alginates in the usual manner. (See Table II.) Also, as commonly practiced, the electrolytes may or may not contain, in amounts up to saturation, oxidized compounds of the anode material. For example, with a zinc anode, the electrolyte may be modified by the addition of zinc oxide or zinc phosphate, as in Examples 20, 21, 26–28, and 31–33 of Table I.

The anode itself may be, but need not necessarily be, amalgamated and it and the cathode may be in any of various designs and sizes.

What is claimed is:

1. In a current generating cell having good anode and cathode stability as evidenced by a low gassing or self-discharge rate comprising a cathode and an anode, an electrolyte consisting essentially of at least one material of the group consisting of the phosphates of potassium, sodium, and ammonium.

2. In a current generating cell having good anode and cathode stability as evidenced by a low gassing or self-discharge rate comprising a cathode and an anode, an electrolyte consisting essentially of at least one material of the group consisting of the phosphates of potassium, sodium, and ammonium, said electrolyte having a pH of from about 4.0 to 12.5.

3. In a current generating cell having good anode and cathode stability as evidenced by a low gassing or self-discharge rate comprising a cathode and an anode, an electrolyte consisting essentially of at least one material of the group consisting of the phosphates of potassium, sodium, and ammonium, containing from about 1 to 3 metal plus ammonium radicals for each phosphate radical.

4. In a current generating cell having good anode and cathode stability as evidenced by a low gassing or self-discharge rate comprising a cathode and an anode, an electrolyte consisting essentially of a phosphate having a formula in the range from $MH_2PO_4$ to $M_3PO_4$, where M is a material of the group consisting of potassium, sodium, and ammonium.

5. In a current generating cell having good anode and cathode stability as evidenced by a low gassing or self-discharge rate comprising a cathode and an anode, an electrolyte consisting essentially of at least one material of the group consisting of the phosphates of potassium, sodium, and ammonium, in a concentration of about 20 to 200 percent of saturation.

6. In a current generating cell having good anode and cathode stability as evidenced by a low gassing or self-discharge rate comprising a cathode comprising a material of the group consisting of lead dioxide, manganese dioxide, and mercuric oxide, and an anode, an electrolyte consisting essentially of at least one material of the group consisting of the phosphates of potassium, sodium, and ammonium.

7. In a current generating cell having good anode and cathode stability as evidenced by a low gassing or self-discharge rate comprising a cathode and an anode comprising a material of the group consisting of zinc, iron, tin, and lead, an electrolyte consisting essentially of at least one material of the group consisting of the phosphates of potassium, sodium, and ammonium.

8. In a current generating cell having good anode and cathode stability as evidenced by a low gassing or self-discharge rate comprising a cathode comprising a material of the group consisting of lead dioxide, manganese dioxide, and mercuric oxide, and an anode comprising a material of the group consisting of zinc, iron, tin, and lead, an electrolyte consisting essentially of at least one material of the group consisting of the phosphates of potassium, sodium, and ammonium.

References Cited in the file of this patent

UNITED STATES PATENTS

| | | |
|---|---|---|
| 1,723,155 | Grimditch | Aug. 6, 1929 |
| 2,472,379 | Lawson | June 7, 1949 |
| 2,800,520 | McGraw | July 23, 1957 |